(12) United States Patent
Wycech

(10) Patent No.: US 6,272,809 B1
(45) Date of Patent: Aug. 14, 2001

(54) THREE DIMENSIONAL LAMINATE BEAM STRUCTURE

(75) Inventor: Joseph S. Wycech, Grosse Pointe Shores, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/496,677

(22) Filed: Feb. 3, 2000

Related U.S. Application Data

(63) Continuation-in-part of application No. 09/149,978, filed on Sep. 9, 1998, now abandoned.

(51) Int. Cl.[7] ............................ B62D 25/00; B62D 21/00; B29C 44/18; B29C 39/10
(52) U.S. Cl. ................. 52/731.6; 52/735.1; 52/309.5; 52/309.7; 52/309.9; 52/309.14; 52/745.19; 52/742.13; 29/897.2; 264/46.5; 264/46.6; 296/187; 296/188; 296/205; 280/124.134; 280/124.153
(58) Field of Search ................ 52/731.6, 735.1, 52/737.4, 738.1, 739.1, 742.13, 745.19, 309.4, 309.5, 309.6, 309.7, 309.9, 309.14; 428/36.5; 29/897.2; 264/46.5, 46.6, 46.7, 46.9; 296/187, 188, 205, 203.03; 280/124.134, 124.153

(56) References Cited

U.S. PATENT DOCUMENTS

| | | | |
|---|---|---|---|
| 3,359,351 | * 12/1967 | Bender | 264/46.9 |
| 4,722,563 | 2/1988 | Loren et al. | . |
| 5,194,199 | * 3/1993 | Thum | 264/46.6 |
| 5,575,526 | 11/1996 | Wycech | . |
| 5,806,919 | 9/1998 | Davies | . |
| 5,866,052 | 2/1999 | Muramatsu | . |
| 6,135,542 | * 10/2000 | Emmelmann et al. | 296/205 |

FOREIGN PATENT DOCUMENTS

| | | | |
|---|---|---|---|
| 59-77973 | * 5/1984 | (JP) | 296/205 |
| 63-203481 | * 8/1988 | (JP) | 264/46.6 |

\* cited by examiner

Primary Examiner—Laura A. Callo
(74) Attorney, Agent, or Firm—Wayne C. Jaeschke; Stephen D. Harper; Harold Pezzner

(57) ABSTRACT

A three-dimensional laminate beam is formed by inserting a preformed foam core insert within a hydra-formed metal section having curved three-dimensional geometry. A reinforcing polymer is pumped in and around the foam core insert so as to be adjacent the inside wall of the shell. The polymer bonds to the inside wall of the shell upon the polymer being cured.

37 Claims, 2 Drawing Sheets

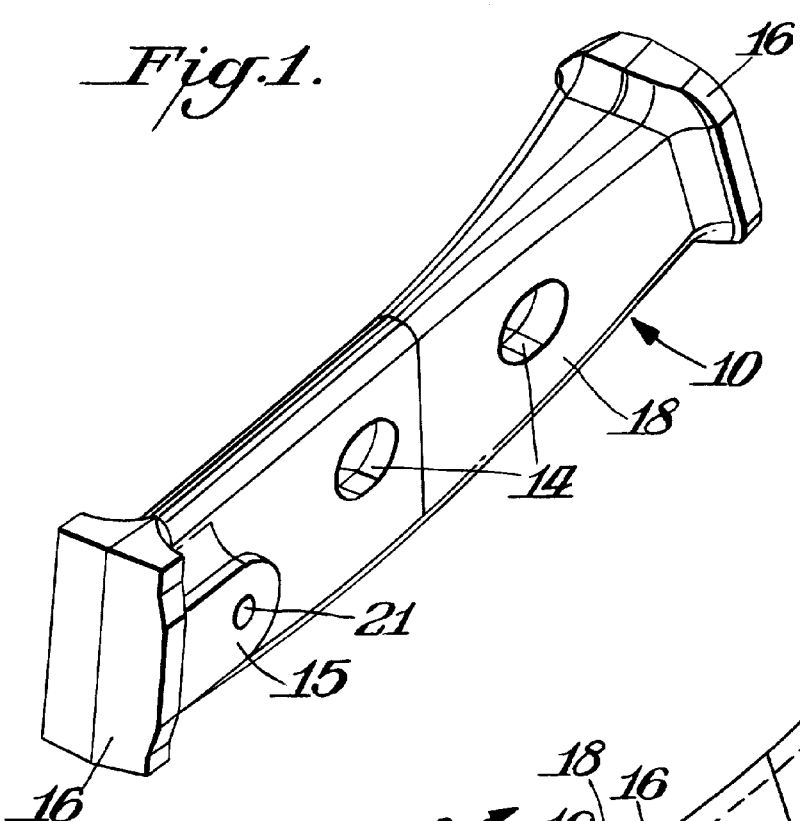
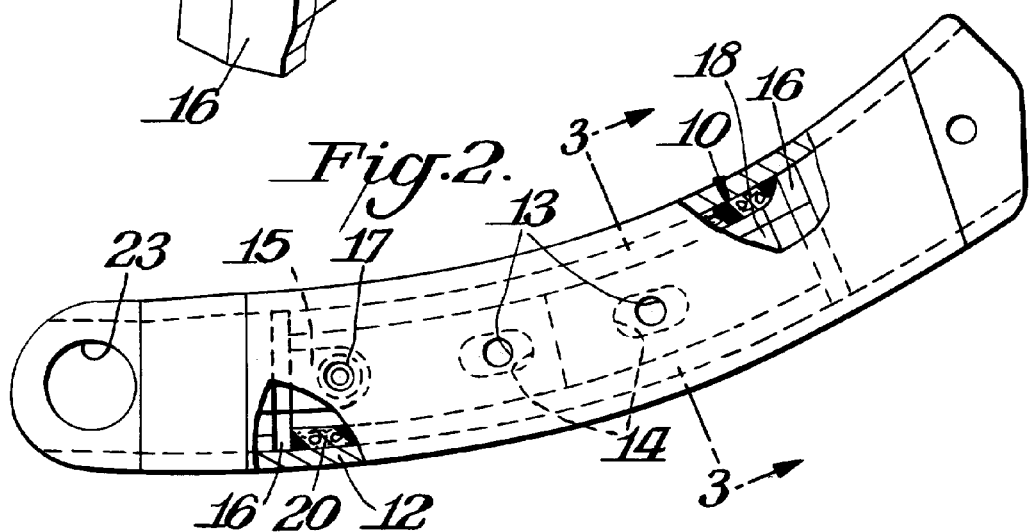
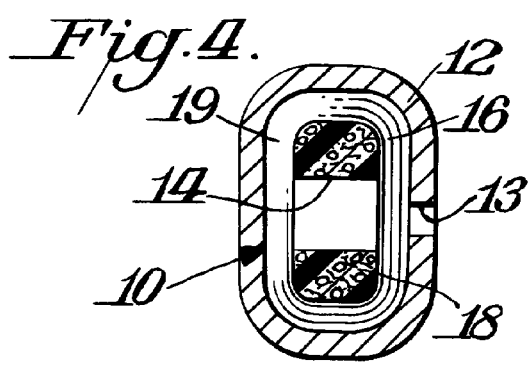 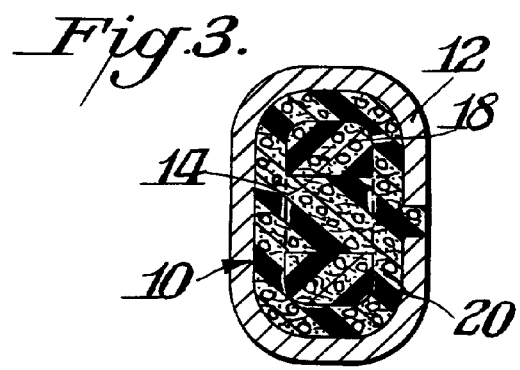

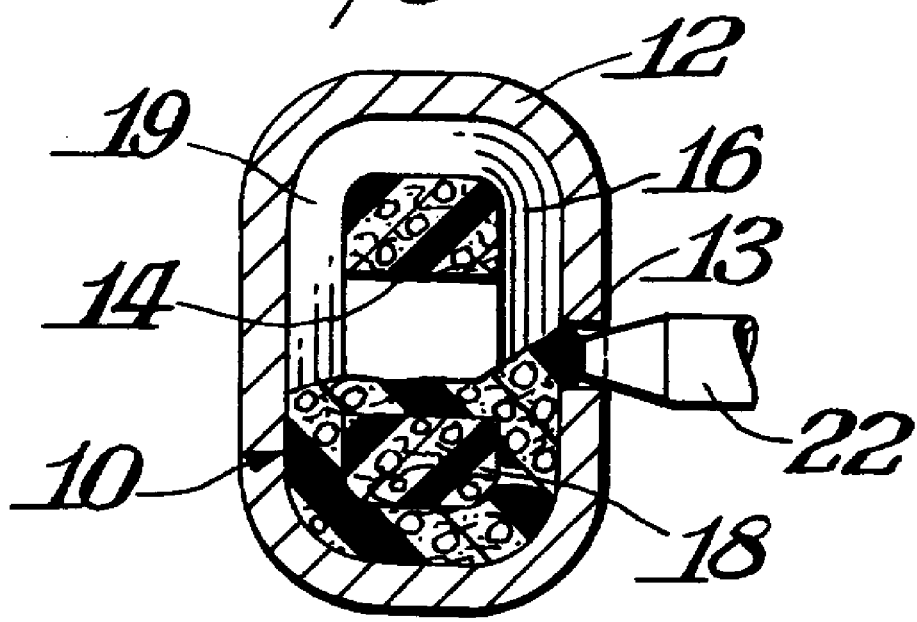

THREE DIMENSIONAL LAMINATE BEAM STRUCTURE

CROSS-REFERENCE TO RELATED APPLICATION

This application is a continuation in part of application Ser. No. 09/149,978 filed Sep. 9, 1998, now abandoned.

BACKGROUND OF THE INVENTION

For various applications, such as in the automotive industry, it is desirable to reinforce a structural section. One approach has been to use a polymer structural foam material for such reinforcement. In some of these applications, however, because of the location or geometry of the part being reinforced, it is difficult to accomplish the intended reinforcement.

Hydra-formed metal sections, for example, may have curved three-dimensional geometry. As a result, reinforcing the section or component is very difficult because the location of the hydra-formed section that is critical and decides the overall performance of the component, is often the section located at a major discontinuity "notch" or curvature. One such part that presents reinforcement problems is a vehicle control arm assembly.

SUMMARY OF THE INVENTION

An object of this invention is to provide a reinforced beam of curved geometry.

A further object of this invention is to provide techniques for reinforcing such a beam.

In accordance with this invention the beam is a hollow curved structure. A pre-molded foam core is inserted into the hollow structure spaced from at least one inside wall of the hollow structure. A polymer is pumped in and around the foam core insert so that after curing the polymer bonds to the inside wall of the structure.

In a preferred practice of the invention the structure is a hydra-formed metal section, such as a vehicle control arm assembly. The pre-shaped foam insert core is preferably made of a lightweight material to minimize the weight of the final laminate beam formed by the invention.

Preferably, the foam core is of the same shape as the hollow interior of the part being reinforced. Flanges, however, may be provided at the outer ends of the core to fit against the inner surfaces of the part being reinforced so as to properly self-locate the insert within the part. Where the part has one or more holes extending through it, the insert core may have aligned holes or passageways so that the foam can be inserted by being pumped through the holes in the part and then flow into the empty space or chamber between the outer surface of the insert and the inner surface of the part with flow being facilitated by means of the holes in the core.

THE DRAWINGS

FIG. 1 is a perspective view of an insert used for reinforcing a control arm assembly beam in accordance with this invention;

FIG. 2 is a side elevational view party broken away and in section of a control arm assembly reinforced by the insert of FIG. 1 and with a reinforcing foam;

FIG. 3 is a cross-sectional view taken through FIG. 1 along the line 3—3;

FIG. 4 is a view similar to FIG. 3 showing the control arm assembly beam and the insert before the foam components are inserted into the combination; and FIG. 5 is a view similar to FIG. 4 showing the foam components inserted into the beam but before there is expansion to the final stage shown in FIG. 3.

DETAILED DESCRIPTION

The present invention is particularly useful for reinforcing hollow sections or structures which are of curved geometry and/or located at locations which are relatively inaccessible.

In the preferred practice of the invention the hollow structure is a metal section, such as a hydra-formed metal section with curved three-dimensional geometry. An example of such section is a control arm assembly, wherein it is desired to reinforce the control arm beam. For such hydra-formed section the critical portion which requires reinforcement in order to maximize the overall performance of the component is often the portion at a major section discontinuity "notch" or curvature. FIG. 2, for example, illustrates an automotive control arm assembly beam made of a hydra-formed metal shell 12 of conventional size and shape and structure and shown as including holes 13 in its side wall. Shell 12 is hollow and open at both ends. As can be seen the shell 12 has a three dimensional geometry which is non-uniform from end to end and which is curved and generally trombone shaped. This geometry includes an inwardly tapered portion which merges with a portion of uniform constant cross-sectional thickness.

Because of its geometry, it is very difficult to reinforce a control arm beam by conventional practices. In accordance with this invention an insert 10 is utilized for reinforcing the control arm beam or shell 12. Insert 10 includes a preformed foam core 18 which is inserted into the hollow interior or cavity of shell 12. Core 18 has an outwardly extending flange 16 at each end. When core 18 is inserted into the widened end of control arm shell 12 the insert 10 becomes properly located by the flanges 16 fitting snugly against the inner surface of shell 12. Accordingly, the provision of the end flanges 16,16 provides a selflocating feature to assure the proper positioning of insert 10 within shell 12.

When insert 10 is to be inserted into shell 12 the narrow end flange 16 at the left hand portion of FIG. 1 would be inserted through the widened open end of shell 12 at the right hand portion of FIG. 2. Insert 10 would then be slid into the cavity of shell 12. Because of the generally snug fitting of end flange 16 rotation of insert 10 within shell 12 during insertion is minimized. The insertion continues and the widened end flange 16 enters shell 12. Insert 10 is continued to be pushed into shell 12 until the widened end flange 16 can move no further inwardly because the tapered portion of the shell limits the extent of insertion of insert 10.

Core 18 further includes a boss 15 which extends outwardly from the outer surface of the core 18 to close or block the hole 17 in shell 12 so that the foam components, later described, cannot escape through hole 17. Except for the provision of the end flanges 16 and the boss 15 attached to core 18 the main or core portion of insert 10 is of the same general shape as control arm shell 12. Thus, as is apparent from FIG. 1 the control arm shell 12 would also be widened at one end and gradually narrow toward the other end, as well as being curved since shell 12 has the same geometry as the shape of core 18. By shaping core 18 the same as but smaller than the inner surface or cavity of shell 12 there is an open area or chamber 19 completely around core 18 which is uniformly spaced from the inner surface of shell 12. FIGS. 4–5, for example, show this open area 19.

As is apparent in particular from FIG. 1 which shows the general shape of core 18 and which would also correspond to the general shape of shell 12 in that portion of the control arm assembly, the shell 12 and core 18 taper inwardly from one end of core 18 to about the longitudinal mid point of core 18. Thereafter, core 18 and control arm shell 12 would be of uniform thickness. If desired, however, the entire core and shell may taper from end to end. As shown in FIG. 2 insert 10 and control arm shell 12 are also curved. FIG. 2 further shows the control arm 12 to have other conventional structure such as the mounting hole 23.

Advantageously use is made of the provision of holes 13 in shell 12. More specifically, passageways 14 are formed in core 18 which are aligned with holes 13. These passageways permit the reinforcing foam components to be pumped into the open space or chamber 19 by facilitating the flow of the components not only on the foam applicating side of the core 18, but also through the core through passageways 14 and then to the opposite side of core 18. As later described the structural foam is preferably made of multiple and preferably two components (but can be a single component) which completely fill the chamber 19 either upon expansion when the components are mixed and activated or simply by pumping sufficient reinforcing foam into the chamber 19. This results in a reinforcing foam or polymer 20 completely around core 18 which becomes bonded to the inner surface of shell 20 as well as to core 18. Thus, core 18 functions to locate a reinforcing polymer 20 within the hollow shell so that after curing the polymer will bond to and reinforce the inside wall of the shell.

End flanges 16 function not only to locate the insert 10 at its proper location within shell 12, but also function as a dam or barrier to confine the polymer 20 within chamber 19.

Core or insert 18 is made of a lightweight pre-shaped or preformed material such as urethane, phenolic or expanded polystyrene. The polymer 20 would be pumped in and around the foam core 18 so as to be located in the chamber 19 between core insert 18 and the inner wall of shell 12. Polymer 20 is then cured such as being heat cured or ambient temperature cured. Upon curing polymer 20 is bonded to the inner wall of shell 12 and to foam core 18 to function as a structural foam. The polymer or structural foam may be, but is not necessarily an expandable foam.

Examples of suitable foam material are found in my U.S. Pat. No. 5,575,526 and in co-pending application Ser. No. 09/103,031 filed Jun. 23, 1998, all of the details of that patent and application are incorporated herein by reference thereto.

The curing of the polymer could be accomplished in any suitable manner. For example, where the shell 12 is a vehicle component, the polymer could be heat cured in an oven such as an e-coat oven during the manufacturing of the vehicle. Alternatively, the polymer could be cured at ambient temperatures such as, for example, about 77° F.

The foam core 18 may be pre-shaped in a geometry which generally conforms to the inner surface of shell 12 thereby minimizing the amount of polymer material required to fill the remaining open space within shell 12. Alternatively, core 18 may be of uniform cross-sectional shape throughout all or most of its length to simplify the structure of the core insert, but which would result in a greater amount of open space. The foam core 18 thus comprises a three-dimensional or essentially two dimensional molded preformed part which occupies some of the volume or space within shell 12 and provides a substrate for the polymer 20 which is pumped into the shell 12.

After insert 10 is properly mounted within shell 12 the nozzle 22 of a pump is inserted into hole 13 in alignment with passageway 14 and the polymer material 20 flows into the chamber 19 as shown in FIG. 5. Upon activation of the two-part polymer compound the polymer expands to completely fill the chamber 19 as shown in FIG. 3.

After the foam components have been completely inserted into the chamber 19 the holes 13 in shell 12 may be temporarily closed until the foam has cured or excess foam flowing outwardly of holes 13 could be later removed or simply left in place.

Although flanges 16 should properly locate the insert 10 within the cavity of shell 12, holes or passageways 14 are made slightly oversized, such as by being oval shaped, to assure alignment with the holes 13 in shell 12.

Although in the preferred practice of the invention the outer surface of core 18 is uniformly spaced from the inner surface of shell 12 the invention may be practiced where the spacing is non-uniform including having the core 18 disposed directly against a portion of the shell surface. It is preferred, however, to have a chamber completely peripherally around core 18 which would be filled with the reinforcing foam at the locations where the greatest reinforcement is desired.

If desired, end walls 16 and boss 15 may be integral with core 18 and thus be made from the same material in, for example, a single molding operation. Alternatively, end walls or flanges 16 may be made separate from and then secured to core 18. Where one or more bosses 15 are provided, the bosses could be integral with the respective flange 16 by a boss forming an ear for the flange. The end flange could be mounted against core 16 or pressed into core 16 and the ear or boss 15 could be secured to core 18 by any suitable means, such as a pin or projection 21 as shown in FIG. 1. Thus, the end flanges 16,16 where made separate from core 18 could be snapped into or secured in any other manner to core 18.

Where flanges 16 are made separate from core 18, flanges 16 could be made of materials which differ from the material of core 18.

It is also to be understood that while specific description has been made of the invention with respect to reinforcing a control arm assembly beam the invention may be practiced for reinforcing any structural member having a hollow curved inner cavity. Preferably, some structure should be provided to properly locate the foam core within the cavity. In the preferred practice of the invention the locating structure is the end flanges on the core. Other structure might include making use of internal bosses or structural elements within the cavity to act as an abutment for the foam core. Similarly, while the invention is advantageously practiced by utilizing pre-existing holes in the structural element being reinforced in order to provide for the insertion or pumping of the foam components into the hollow cavity, other manners of inserting the foam components may also be used. For example, if the structural member being reinforced does not include any holes in its side wall, feed holes may be formed in, for example, one of the end flanges 16 of insert 10 so that the foam components can then be pumped through the feed hole or holes in end wall 16 into the open space between the core and the inner surface of the member being reinforced. Preferably, although not necessarily, holes such as passageways 14 could also be provided in any suitable number and at any suitable locations to facilitate the foam components readily flowing throughout and thereby readily filling the chamber 19.

The invention thus results in a three-dimensional laminate beam which is formed by pumping the polymer around the pre-molded foam core. This is the only means necessary to reinforce such a hydra-formed metal section.

What is claimed is:

1. A three dimensional laminate beam structure comprising an outer shell having inside walls and an open space between said walls, said shell tapering inwardly in thickness over a portion of its length, said shell having a curved three-dimensional geometry from end to end, an insert having a core mounted within said shell spaced from at least one of said inside walls, a reinforcing polymer within said shell, and said polymer being disposed against said core insert and bonded to said core and to said inside wall of said shell.

2. The beam of claim 1 wherein said core is made of a lightweight foam.

3. The beam of claim 2 wherein said shell is made of a metal material being of uniform shape along a portion of its length.

4. The beam of claim 3 wherein said shell is a hydra-formed metal section.

5. The beam of claim 4 wherein said beam comprises a vehicle control arm assembly.

6. The beam of claim 2 wherein said polymer is an expandable structural foam.

7. The beam of claim 2 wherein said polymer is a non-expandable structural foam.

8. The beam of claim 2 wherein said polymer is heat curable.

9. The beam of claim 2 wherein said polymer is ambient temperature curable.

10. The beam of claim 1 including locating structure extending outwardly from said core and fitting snugly against said inside wall of said shell to properly locate said insert in said shell.

11. The beam of claim 10 wherein said locating structure includes an end flange on one end of said core, and said core being spaced from said inside wall of said shell to create a chamber completely peripherally around said core.

12. The beam of said claim 11 wherein said flange is a first flange, said locating structure including a second end flange mounted outwardly from said core remote from said first flange, and said second flange fitting snugly against said inside wall of said shell whereby said first flange and said second flange comprise end walls for said chamber.

13. The beam of claim 12 including a hole in a side wall of said shell to permit said polymer to be inserted into said chamber through said hole.

14. The beam of claim 13 including a passageway in said core in line with said hole in said shell.

15. The beam of claim 14 wherein there are two of said holes in said shell and two of said aligned passageways in said core.

16. The beam of claim 14 including a boss connected to one of said flanges, and extending outwardly of said core.

17. The beam of claim 14 wherein said tapered portion of said shell merges with the remaining portion of said shell which is of uniform cross-section, and said core having a shape which conforms to the shape of said outwardly disposed shell but is of smaller size to create said chamber therebetween.

18. A reinforcement insert for insertion into the cavity of a structural member to reinforce the structural member, said insert having an elongated core made of a lightweight material, said core being curved over its length, a portion of said core tapering in its thickness inwardly from one end of said core, and locating structure extending outwardly from said core for locating said insert in a predetermined position within the structural member.

19. The insert of claim 18 wherein said core is made of a lightweight foam.

20. The insert of claim 19 including locating structure extending outwardly from said core for fitting snugly against the inside wall of the structural member to properly place said insert within the structural member.

21. The insert of claim 20 wherein said locating structure includes a flange extending outwardly from said core at one end of said core.

22. The insert of claim 21 wherein said flange is a first flange, and a second flange extending outwardly from said core at an end of said core opposite said first flange.

23. The insert of claim 22 including at least one passageway extending completely through said core.

24. The insert of claim 23 wherein said tapered portion of said core merges with the remaining portion of said core which is of uniform cross-sectional thickness.

25. The insert of claim 24 including a boss secured to one of said flanges and extending outwardly from said core.

26. A method of forming a three-dimensional laminate beam comprising the steps of inserting a pre-formed insert within a hollow shell with the insert having an elongated lightweight core spaced from at least one inside wall of the shell and with the shell tapering inwardly in thickness over a portion of its length and with the shell being curved to form a curved three-dimensional geometry from end to end, pumping a reinforcing polymer in and around the core, and curing the polymer to cause the polymer to bond to the inside wall of the shell and to the core.

27. The method of claim 26 including locating the insert within the hollow shell by means of locating structure extending outwardly from the core with the locating structure fitting snugly against the inside wall of the shell.

28. The method of claim 27 wherein the core conforms in shape to the shape of the inside wall of the shell but is of smaller dimension to create a peripheral chamber around the core.

29. The method of claim 28 including pumping the polymer into the chamber through a hole in the wall of the shell.

30. The method of claim 29 wherein the polymer is pumped through the hole in the shell and flows through a passageway in the core aligned with the hole in the shell, and wherein the polymer is of multi-component form.

31. The method of claim 30 wherein the shell an the core each include a tapered portion which merges with a remaining portion that is of uniform cross-sectional thickness and the core including an end flange at the tapered end of the core and an end flange at the uniform thickness end of the core with each of the flanges fitting snugly against the inside wall of the shell.

32. The method of claim 26 wherein the shell is made of a hydra-formed metal.

33. The method of claim 26 wherein the resulting beam is a vehicle control arm assembly.

34. The method of claim 26 wherein the resulting beam is a vehicle component.

35. The method of claim 26 wherein the polymer is heat cured.

36. The method of claim 26 wherein the polymer expands upon curing.

37. The method of claim 26 wherein the polymer is cured at ambient temperatures.

* * * * *

UNITED STATES PATENT AND TRADEMARK OFFICE
CERTIFICATE OF CORRECTION

PATENT NO. : 6,272,809 B1
DATED : August 14, 2001
INVENTOR(S) : Wycech

It is certified that error appears in the above-identified patent and that said Letters Patent is hereby corrected as shown below:

Column 6,
Line 47, after "shell", delete "an", and insert therefor -- and --.

Signed and Sealed this

Eighth Day of April, 2003

JAMES E. ROGAN
*Director of the United States Patent and Trademark Office*